(12) United States Patent
Franckowiak et al.

(10) Patent No.: US 11,143,183 B2
(45) Date of Patent: Oct. 12, 2021

(54) GEAR PUMP BEARING WITH HYBRID PAD SHUTOFF

(71) Applicant: Hamilton Sundstrand Corporation, Charlotte, NC (US)

(72) Inventors: Timothy J. Franckowiak, Rockford, IL (US); Zachary Allen Ray Le Duc, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 253 days.

(21) Appl. No.: 16/364,525

(22) Filed: Mar. 26, 2019

(65) Prior Publication Data
US 2020/0309123 A1    Oct. 1, 2020

(51) Int. Cl.
| | |
|---|---|
| *F04C 15/00* | (2006.01) |
| *F04C 2/18* | (2006.01) |
| *F16C 32/06* | (2006.01) |
| *F04B 1/053* | (2020.01) |
| *F04C 14/00* | (2006.01) |
| *F16C 33/10* | (2006.01) |
| *F04C 15/06* | (2006.01) |
| *F02C 7/22* | (2006.01) |
| *F04C 2/12* | (2006.01) |
| *F01C 21/02* | (2006.01) |

(52) U.S. Cl.
CPC .............. *F04C 15/064* (2013.01); *F02C 7/22* (2013.01); *F04C 2/123* (2013.01); *F04C 2240/50* (2013.01)

(58) Field of Classification Search
CPC .......... F04C 15/064; F04C 2/123; F04C 2/18; F04C 15/0046; F04C 15/0088; F04C 15/0034; F02C 7/22; F01C 21/02; F16C 33/106; F16C 33/1085; F16C 32/064
See application file for complete search history.

(56) References Cited

U.S. PATENT DOCUMENTS

| | | | |
|---|---|---|---|
| 2,157,285 A | * | 5/1939 | Egersdorfer .............. F04C 2/14 137/565.28 |
| 2,635,551 A | | 4/1953 | De Lancey |
| | | | (Continued) |

OTHER PUBLICATIONS

European Search Report for EP Application No. 19209660.0 dated Jul. 27, 2020.

*Primary Examiner* — Deming Wan
(74) *Attorney, Agent, or Firm* — Carlson, Gaskey & Olds, P.C.

(57) ABSTRACT

A gear pump could be said to include a first gear and a second gear intermeshed with the first gear. An inlet side is configured to have an inlet connection connected thereto. A discharge side is configured to have a first discharge connection connected thereto. At least one shaft is in operable communication with each of the first and second gears. A bearing is configured to support at least one of the shafts via an inner bore and having an outer peripheral surface. A valve bore is formed into bearing between the inner bore and the outer peripheral surface. A second discharge connection is formed into the bearing. A tap provides fluidic communication between the valve bore and a pad defined in the inner bore. A valve is positioned in the valve bore. The valve includes a moving valve member. A spring biases the moving valve member in a direction toward the second discharge connection. A fuel pump system is also disclosed.

20 Claims, 4 Drawing Sheets

(56) References Cited

U.S. PATENT DOCUMENTS

| | | | |
|---|---|---|---|
| 5,881,564 A * | 3/1999 | Kishimoto | F04D 27/0292 |
| | | | 62/193 |
| 6,123,531 A | 9/2000 | Blume et al. | |
| 2009/0229920 A1 * | 9/2009 | Yang | F16N 11/04 |
| | | | 184/7.4 |
| 2012/0020597 A1 * | 1/2012 | Oledzki | F16C 32/064 |
| | | | 384/114 |
| 2013/0081720 A1 * | 4/2013 | Schmidt | F04C 14/06 |
| | | | 137/565.11 |
| 2013/0320147 A1 * | 12/2013 | Lewis | F04C 15/0096 |
| | | | 244/135 R |
| 2018/0051742 A1 * | 2/2018 | Yates | F16C 17/04 |
| 2018/0209419 A1 | 7/2018 | Veilleux, Jr. et al. | |
| 2018/0340471 A1 | 11/2018 | Nyzen et al. | |

\* cited by examiner

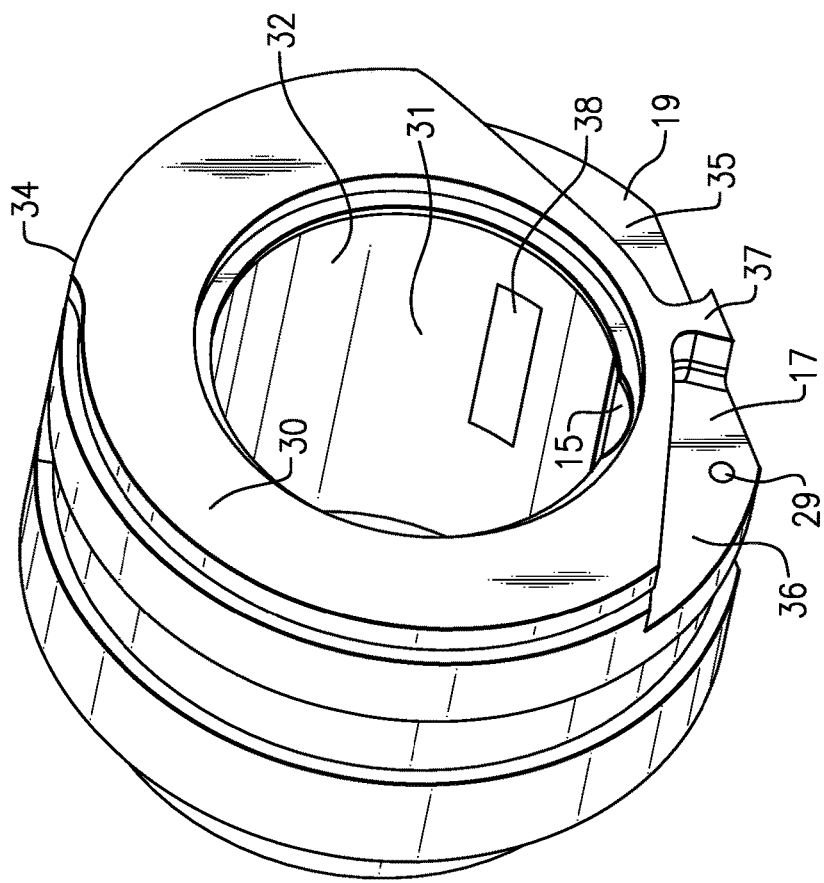
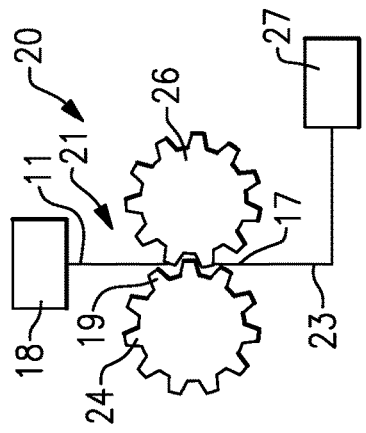
FIG.1A
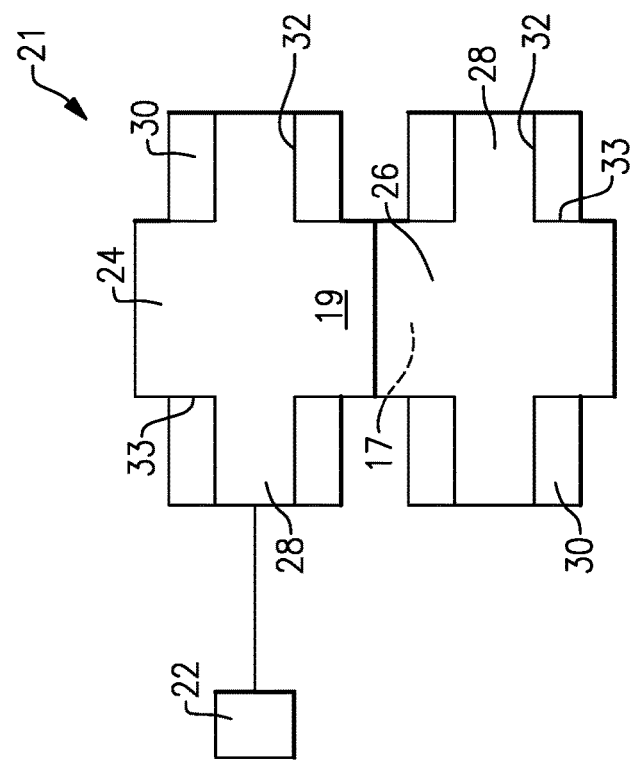
FIG.1B
FIG.2A

GEAR PUMP BEARING WITH HYBRID PAD SHUTOFF

BACKGROUND

This application relates to a bearing for a gear pump provided with a pad to receive a fluid.

Gear pumps are known, and typically include a drive gear engaging a driven gear. The drive gear drives the driven gear. A fluid is moved by the two gears between an inlet and a discharge.

Gear pumps are utilized in aerospace applications, among many other applications. Recent trends in aerospace fuel systems require gear pumps to develop higher differential pressures between the inlet and a discharge than previous required. Also these pressures must be developed at higher temperatures than previously required. Both of these factors contribute to conditions that reduce the effectiveness of a conventional hydrodynamic bearing through reduced fluid viscosity and higher journal-bearing loading due to higher pump pressures. Generally, a balance between a load created in the journal-bearing by the pump differential pressure and a countering load generated by a hydrodynamic fluid film inside the journal-bearing causes a biased, or eccentric, position of the shaft for a particular high load condition in the bearing. It is known to supply a pressurized fluid to a pad at an inner peripheral surface of a bore in the bearing. This fluid provides support against loading of the shaft against the bearing.

At lower power operation, the fluid at the pad is not needed. Continuing to supply the fluid at such conditions reduces the gear pump's efficiency. This inefficiency drives pumps that are sized at low speed conditions to become larger than would otherwise be required to make up for the inefficiency.

Valves have been proposed to control the flow of the fluid to the pad. The valves have generally been part of complex systems that unduly increase the weight of the gear pump.

SUMMARY

A gear pump could be said to include a first gear and a second gear intermeshed with the first gear. An inlet side is configured to have an inlet connection connected thereto. A discharge side is configured to have a first discharge connection connected thereto. At least one shaft is in operable communication with each of the first and second gears. A bearing is configured to support at least one of the shafts via an inner bore and having an outer peripheral surface. A valve bore is formed into bearing between the inner bore and the outer peripheral surface. A second discharge connection is formed into the bearing. A tap provides fluidic communication between the valve bore and a pad defined in the inner bore. A valve is positioned in the valve bore. The valve includes a moving valve member. A spring biases the moving valve member in a direction toward the second discharge connection. A fuel pump system is also disclosed.

These and other features may be best understood from the following drawings and specification.

BRIEF DESCRIPTION OF THE DRAWINGS

FIG. 1A schematically shows a fuel supply system.
FIG. 1B shows a gear pump incorporated into the FIG. 1A system.
FIG. 2A shows a bearing.

DETAILED DESCRIPTION

Figure 2B:
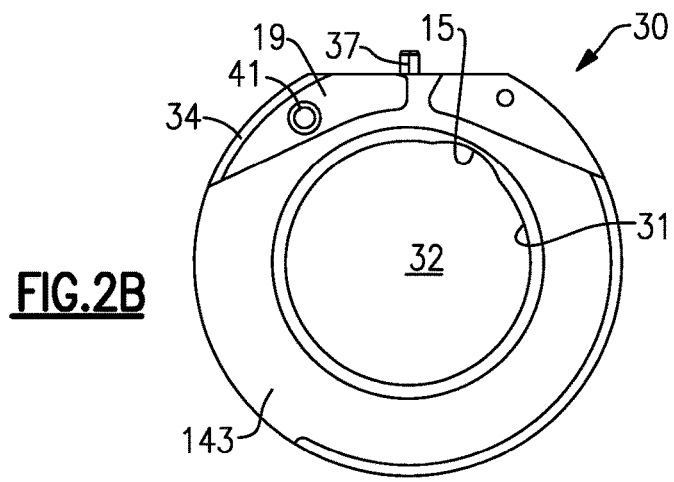
FIG. 2B shows bearing details.

FIG. 1A shows a fuel supply system 20 including a fuel tank 18 connected to an inlet side 19 of a gear pump 21 through a fluid connection 11. As known, gear pump 21 includes two engaged gears, a drive gear 24 and a driven gear 26. The gears rotate and move fuel from the tank 18 to a combustor 27 for a gas turbine engine. A discharge side 17 of the gear pump 21 is connected to combustor 27 through a fluid connection 23. While this particular application is illustrated, it should be understood gear pumps utilized in any number of other applications, both in aerospace and in other industries, would benefit from this disclosure.

FIG. 1B shows details of the gear pump. A drive source 22 drives the drive gear 24 which is engaged to driven gear 26. When drive gear 24 is driven to rotate, it rotates driven gear 26. Gears 24 and 26 both have shafts 28 supported on an inner bore 32 in bearings 30.

During operation and, in particular, at high differential pressure conditions, the shafts 28 are loaded against the bearings 30.

FIG. 2A shows details of a bearing 30 having an inner bore 32. An inner peripheral surface 31 of the inner bore 32 is spaced from an outer peripheral surface 34. A separation point 37 is between the discharge side 17 from the suction side 19. A connection to discharge pressure fluid may be taken from an area identified as 36. As an example, a tap 29 connects discharge pressure fluid to a hybrid pad 38, as explained. A leak groove 15 leaks a fluid at a pressure which is much lower than a discharge pressure, and typically slightly higher than an inlet pressure, to the inner peripheral surface 31. A so called hybrid pad 38 is also formed at the inner peripheral surface 31; this provides a hydrostatic support for the shaft 28 as well as introduces extra fluid to the inner peripheral surface 31 to support hydrodynamic fluid film development. The hybrid pad 38 will receive fluid at a pressure higher than that supplied from the leak groove 15, and typically discharge pressure minus plumbing losses between pump discharge through tap 29 and a valve, and the pressure at 38.

FIG. 2B shows an end view of the bearing 30, the inner bore 32 having the inner peripheral surface 31, and the outer peripheral surface 34. A valve cartridge 41 is inserted into a thickness of a bearing body 143, between the inner peripheral surface 31 and outer peripheral surface 34. Note valve cartridge 41 is on the inlet side 19.

Figure 2C:
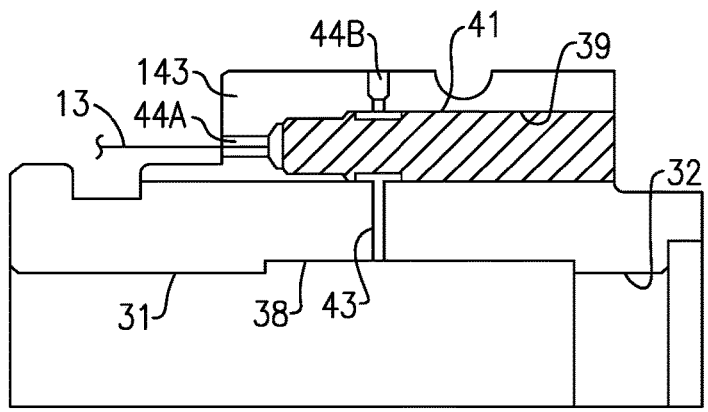
FIG. 2C is cross-section through one embodiment of a bearing.

FIG. 2C shows details of the valve cartridge 41. Connection 13 is connected to an area that will have discharge pressure fluid when pump 21 is operating. As an example, connection 13 might communicate to tap 29. A tap 44A is made to communicate discharge pressure to one side of the valve cartridge 41. A second tap 44B is optional, and would be provided with the FIG. 3A embodiment as disclosed below, but need not be provided with the FIG. 3B embodiment. The cartridge 41 is received in a valve bore 39 formed in the bearing body 143.

As can be appreciated from FIG. 2C, the bearing body 143 is generally solid between inner peripheral surface 31 and outer peripheral surface 40 other than taps 44A, 44B, and valve bore 39. A tap 43 communicates discharge pressure fluid to the pad 38 selectively under the control of a valve in the valve cartridge 41, as will be explained below.

Figure 2D:
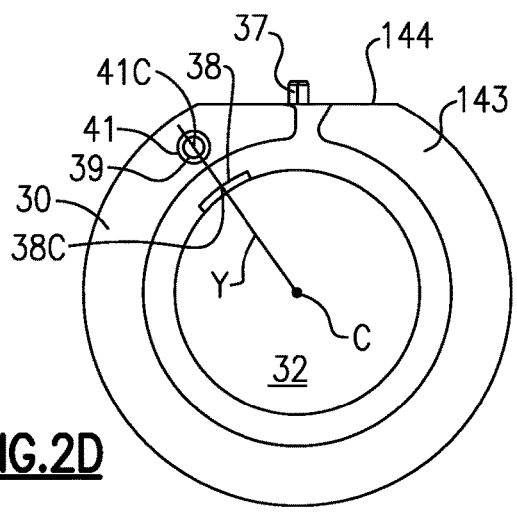
FIG. 2D shows further bearing details.

FIG. 2D shows a location of the valve cartridge 41. Center axis C can define a radius Y which extends through a center axis 41C of the valve cartridge 41, and bore 39. The radius Y also extends through a center 38C of the pad 38.

Returning to FIG. 2D, while the valve cartridge 41 is shown circumferentially aligned with the pad 38 it could also be located in any number of locations.

Figure 2E:
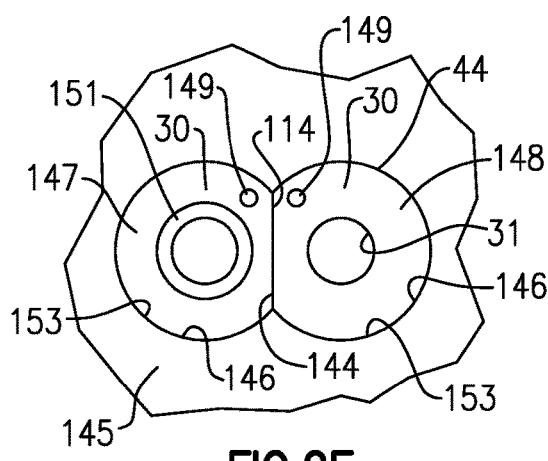
FIG. 2E shows another feature.

FIG. 2E shows bearings 30 each having a flat face 144 which abuts a flat face of the mating bearing. A bearing to the right is shown as having a single material thickness 148 formed of a soft metal (such as a bronze material). In this embodiment, the valve 149 is shown between the inner bore 31 and the outer peripheral surface 44, and within the single thickness of material 148. The term "soft" should be interpreted relative to the material forming gears 24 and 26. The bearing material has a lower yield strength than the material forming the gears.

The bearing to the left is shown as having an inner material 151 formed of a soft material such as bronze, and an outer layer 147 surrounding the inner material 151. Outer layer 147 might be an aluminum. Here the valve 149 is mounted within the outer material 147. Still, the combination of the two materials 147 and 151 together define the bearing, such that the valve 149 is between the inner bore and the outer peripheral surface of the bearing. As shown, the bearings are mounted within a bore 146 in a housing 145 that has at least part circular cross-sectional areas 153.

Figure 3A:
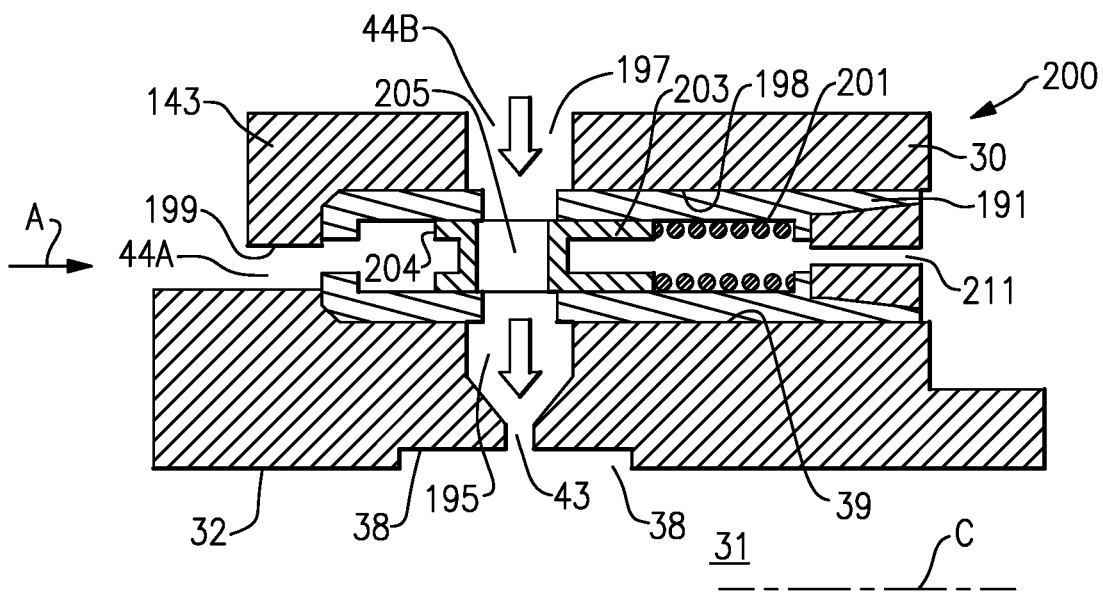
FIG. 3A shows a valve embodiment.

FIG. 3A shows a first valve embodiment 200 in a bearing 30. This embodiment utilizes both taps 44A and 44B from the FIG. 2C cross-section. Tap 44A communicates discharge pressure fluid into an extension 199 of the valve bore 39. A valve face 204 will receive a bias force from the pressurized fluid when the connection 199 is connected to a discharge pressure source. The tap 44B is provided to a bore 197. A moving valve member 203 includes face 204 and a port 205. A spring 201 biases the moving valve member 203 to the left from the position shown in FIG. 3A. A cartridge 191 includes the valve member 203 and spring 201. In the position shown in FIG. 3A, the port 205 connects to a bore 195 and tap 43. As mentioned above tap 43 is connected to the pad 38.

A suction pressure port 211 provide a connection to an area with suction pressure fluid. This creates a bias force to move the valve member 203 to the left, with the spring force, and in opposition to a force from the discharge pressure tap 44A.

Thus, when a pressure differential between the discharge pressure and the suction pressure is lower than a predetermined design amount, the valve member 203 is moved to the left from the FIG. 3A position and the port 205 no longer is aligned with the bore 197. Fluid is not supplied to the pad 38 in this position.

Here, the spring 201 and suction pressure from port 211 bias the moving valve 203 to a closed (or blocking) position and discharge pressure fluid acts to open the valve. The FIG. 3B valve operates in a similar manner.

However, as the differential pressure increases the moving valve member 203 will move to the FIG. 3A position. In this embodiment, the valve member 203 moves along an axial direction A, which is parallel to a rotational axis C of the drive or driven gear which is supported in the illustrated bearing 30. In other embodiments, the axis A of movement of the moving valve member need not be parallel to the axis C.

In the FIG. 3A embodiment, it could be said the moving valve member 203 blocks or allows flow from the discharge pressure source through bore 197 to the tap 43 in a direction generally perpendicular to the direction of valve movement A.

Figure 3B:
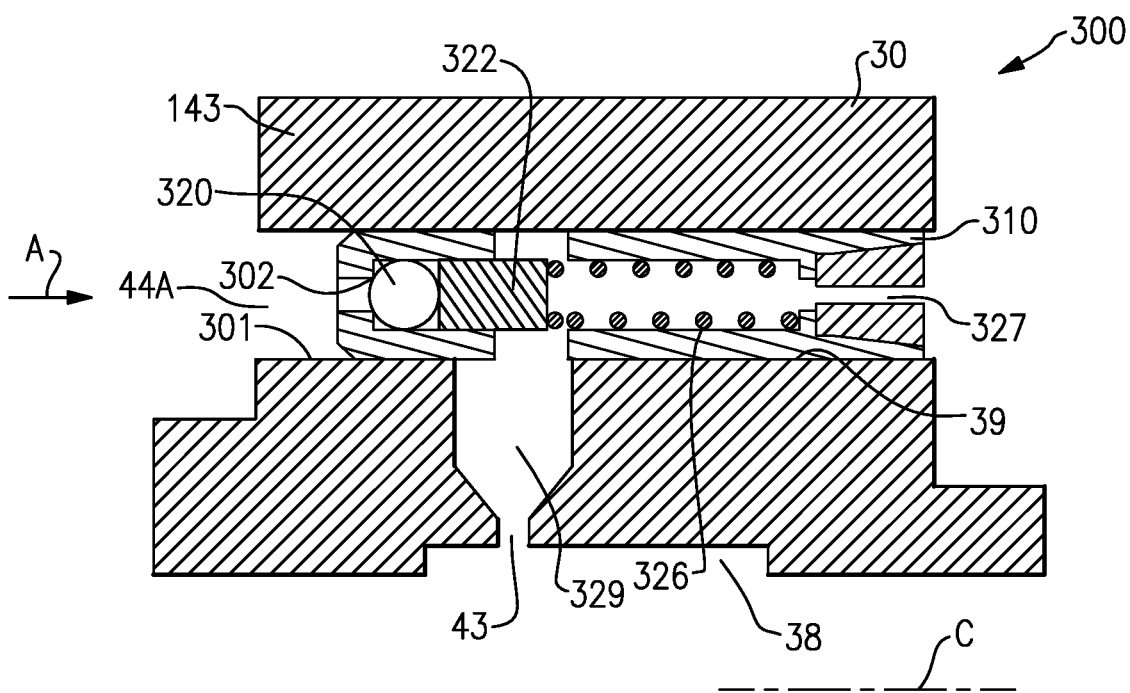
FIG. 3B shows an alternative valve embodiment.

FIG. 3B shows a valve embodiment 300 wherein the tap 44A is again connected to a port 301, which is part of the bore 39. A valve cartridge 310 is mounted in bore 39. A valve seat 302 selectively contacts a ball valve 320. A plunger 322 is biased against the ball valve 320 by a spring 326 and a tap to suction 327. In this embodiment, if the differential pressure between connection 44A and connection 327 exceeds the design pressure, discharge pressure fluid can move the valve 320 away from the seat 302, and fluid can flow into a bore 329 and to the tap 43. In this embodiment it could be said that the discharge pressure fluid moves in a direction parallel to the direction of valve movement A.

When the valve member 320 moves away from the valve seat, discharge pressure fluid flows between the valve member and the valve seat 302 to bore 329. It should be understood plunger 322 is grooves, or other structure to facilitate this fluid.

Figure 4A:
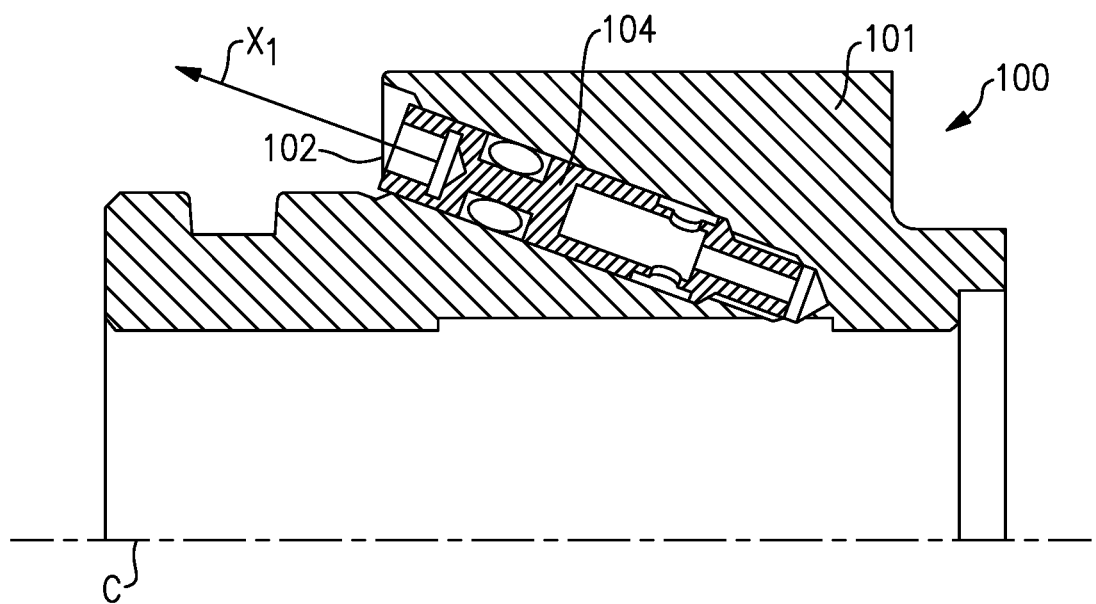
FIG. 4A shows a valve bore alternative.

FIG. 4A shows an embodiment 100 having a bearing 101 with a valve bore 102 receiving a valve cartridge 104, and extending along an axis of movement $X_1$ that has a component extending parallel to a center line C of the bearing embodiment 100, but also has a component extending radially inwardly and toward the center line C.

Figure 4B:
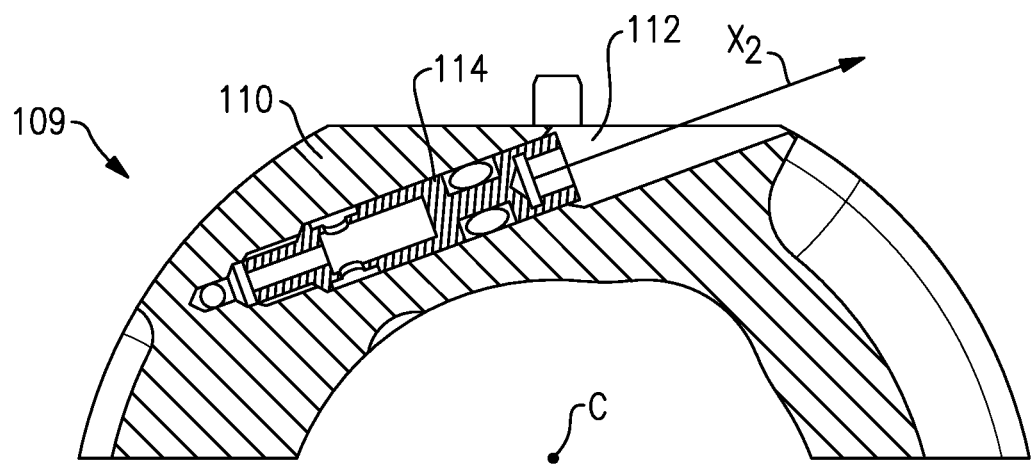
FIG. 4B shows another valve bore alternative.

FIG. 4B shows an embodiment 109 having a bearing body 110 with a valve bore 112 receiving a valve cartridge 114. This valve will move along an axis of movement $X_2$ which is transverse or circumferential about the center line C.

The FIGS. 4A and 4B embodiments may be utilized with valve structure as shown in FIG. 3A or 3B.

A gear pump could be said to include a first gear 24 and a second gear 26 intermeshed with the first gear 24. An inlet side 19 is configured to have an inlet connection 11 connected thereto. A discharge side 17 is configured to have a first discharge connection 23 connected thereto. At least one shaft in operable communication with each of the first and second gears. A bearing 30 is configured to support at least one of the shafts 28 via an inner bore 32 and having an outer peripheral surface 34. A valve bore 39 is formed into bearing 30 between inner bore 32 and outer peripheral surface 34. A second discharge connection 44A is formed into the bearing. A tap 195/329 provides fluidic communication between the valve bore 39 and a pad 38 is defined in inner bore 32.

A valve 41 is positioned in valve bore 39. The valve includes a moving valve member 203/320. A spring biases 201/326 moving valve member 203/320 in a direction toward the second discharge connection 44A.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:
1. A gear pump comprising:
   a first gear;
   a second gear intermeshed with the first gear defining an inlet side configured to have an inlet connection connected thereto, and a discharge side configured to have a first discharge connection connected thereto;

at least one shaft in operable communication with each of the first and second gears;

a bearing configured to support at least one of the at least one shafts via an inner bore and having an outer peripheral surface, a valve bore being formed into said bearing between said inner bore and said outer peripheral surface, said bearing defining a second discharge connection, a tap providing fluid from said discharge side through the valve bore and to a pad defined in said inner bore: and a valve positioned in said valve bore comprising;
a moving valve member; and
a spring biasing said moving valve member in a direction toward the second discharge connection, and said moving valve member allowing or limiting flow from the second discharge connection reaching said pad as a pressure on said second discharge connection varies.

2. The gear pump as set forth in claim 1, wherein said spring biases said moving valve member to a closed position, and an inlet connection is also provided to said inlet side of said gear pump to bias said valve member in combination with said spring.

3. The gear pump as set forth in claim 2, wherein a bearing body forming said bearing is solid between said inner peripheral surface and said outer peripheral surface.

4. The gear pump as set forth in claim 2, wherein said moving valve member moves along a movement direction which is parallel to a rotational axis of said first and second gears.

5. The gear pump as set forth in claim 2, wherein said moving valve member moves along a movement direction which has a component parallel to a rotational axis of said first and second gears, but also has a component radially inwardly towards said rotational axis.

6. The gear pump as set forth in claim 2, wherein said moving valve member moves along a movement direction which extends circumferentially relative to a rotational axis of at least one of said first and second gears.

7. The gear pump as set forth in claim 2, wherein when said moving valve member moves away from a valve seat, discharge pressure can flow between said moving valve member and said valve seat.

8. The gear pump as set forth in claim 2, wherein said valve member selectively allows flow from a third discharge connection in a direction generally perpendicular to a direction of valve movement.

9. The gear pump as set forth in claim 1, wherein a material forming said bearing has a lower yield strength than a material forming said first and second gears.

10. The gear pump as set forth in claim 1, wherein said bearing includes a bearing supporting each of said at least one shafts, and each of said bearings having a flat face at a portion of said outer peripheral surfaces, and said flat faces of said bearings abutting a flat face of another one of said bearings.

11. A fuel pump system for a gas turbine engine comprising:
a fuel tank connected to an inlet side of a gear pump, and a discharge side of said gear pump connected to a combustor of a gas turbine engine;
the gear pump including a first gear intermeshed with a second gear;
the first and second gears defining said inlet side, and said discharge side, at least one shaft in operable communication with each of the first and second gears;
a bearing configured to support at least one of the at least one shafts via an inner bore and having an outer peripheral surface, a valve bore being formed into said bearing between said inner bore and said outer peripheral surface, said bearing defining a second discharge connection, a tap providing fluid from aid discharge side through the valve bore and to a pad defined in said inner bore: and
a valve positioned in said valve bore and having a moving member, and a spring biasing said moving valve member in a direction toward the second discharge connection, and said moving valve member allowing or limiting flow from the second discharge connection reaching said pad as a pressure on said second discharge connection varies.

12. The fuel pump as set forth in claim 11, wherein said spring biases said moving valve member to a closed position, and an inlet connection is also provided to said inlet side of said gear pump to bias said valve member in combination with said spring.

13. The fuel pump as set forth in claim 12, wherein a bearing body forming said bearing is solid between said inner peripheral surface and said outer peripheral surface.

14. The fuel pump as set forth in claim 12, wherein said moving valve member moves along a movement direction which is parallel to a rotational axis of said first and second gears.

15. The fuel pump as set forth in claim 12, wherein said moving valve member moves along a movement direction which has a component parallel to a rotational axis of said first and second gears, but also extends radially inwardly towards said rotational axis.

16. The fuel pump as set forth in claim 12, wherein said moving valve member moves along a movement direction which extends circumferentially relative to a rotational axis of at least one of said first and second gears.

17. The fuel pump as set forth in claim 12, wherein when said moving valve member moves away from a valve seat discharge pressure can flow between said moving valve member and said valve seat.

18. The fuel pump as set forth in claim 11, wherein a material forming said bearing has a lower yield strength than a material forming said first and second gears.

19. The fuel pump as set forth in claim 11, wherein said bearing includes a bearing supporting each of said at least one shafts, and each of said bearings having a flat face at a portion of said outer peripheral surfaces, and said flat faces of said bearings abutting a flat face of another one of said bearings.

20. A fuel pump system for a gas turbine engine comprising:
a fuel tank connected to an inlet side of a gear pump, and a discharge side of said gear pump connected to a combustor of the gas turbine engine;
the gear pump including a first gear intermeshed with a second gear;
the first and second gears defining said inlet side, and said discharge side, at least one shaft in operable communication with each of the first and second gears;
a bearing configured to support at least one of the at least one shafts via an inner bore and having an outer peripheral surface, a valve bore being formed into said bearing between said inner bore and said outer peripheral surface, said bearing defining a second discharge connection, a tap providing fluidic communication between the valve bore and a pad defined in said inner bore: and a valve positioned in said valve bore and having a moving member, and a spring biasing said moving valve member in a direction toward the second discharge connection;

wherein said spring biases said moving valve member to a closed position, and an inlet connection is also provided to said inlet side of said gear pump to bias said valve member in combination with said spring; and, wherein said moving valve member selectively allows flow from a third discharge connection in a direction generally perpendicular to a direction of valve movement.

\* \* \* \* \*